United States Patent
Verlaan et al.

(10) Patent No.: US 6,875,729 B2
(45) Date of Patent: Apr. 5, 2005

(54) SEALING COMPOSITION

(75) Inventors: Marco L. Verlaan, Rotterdam (NL); Niels van der Werff, The Hague (NL)

(73) Assignee: Halliburton Energy Services, Inc., Duncan, OK (US)

( * ) Notice: Subject to any disclaimer, the term of this patent is extended or adjusted under 35 U.S.C. 154(b) by 314 days.

(21) Appl. No.: 10/162,506

(22) Filed: Jun. 4, 2002

(65) Prior Publication Data

US 2003/0224946 A1 Dec. 4, 2003

(51) Int. Cl.⁷ .......... C09K 3/00; E21B 33/13; C04B 14/00
(52) U.S. Cl. ........ 507/269; 507/224; 507/225; 166/293; 106/724
(58) Field of Search .......... 166/293; 507/269, 507/224, 225; 106/724

(56) References Cited

U.S. PATENT DOCUMENTS

| | | | |
|---|---|---|---|
| 4,558,092 A | * 12/1985 | Reinecke et al. | 524/817 |
| 4,662,943 A | * 5/1987 | Baker et al. | 106/720 |
| 4,707,188 A | * 11/1987 | Tsuda et al. | 106/639 |
| 5,009,269 A | 4/1991 | Moran et al. | |
| 5,099,922 A | * 3/1992 | Ganguli | 166/293 |
| 5,293,938 A | 3/1994 | Onan et al. | |
| 5,335,726 A | 8/1994 | Rodrigues | |
| 5,358,051 A | 10/1994 | Rodrigues | |
| 5,447,197 A | * 9/1995 | Rae et al. | 166/293 |
| 5,641,352 A | * 6/1997 | Jeknavorian et al. | 106/808 |
| 5,688,844 A | * 11/1997 | Chatterji et al. | 524/8 |
| 5,836,392 A | 11/1998 | Urlwin-Smith | |
| 5,850,880 A | * 12/1998 | Moran et al. | 166/293 |
| 5,945,387 A | 8/1999 | Chatterji et al. | |
| 5,968,879 A | 10/1999 | Onan et al. | |
| 6,192,986 B1 | 2/2001 | Urlwin-Smith | |
| 6,196,317 B1 | 3/2001 | Hardy | |
| 6,288,174 B1 | * 9/2001 | Ikegami et al. | 525/301 |
| 6,462,110 B2 | * 10/2002 | Satoh et al. | 524/5 |
| 6,668,928 B2 | 12/2003 | Brothers | |
| 2003/0159625 A1 | * 8/2003 | Reddy et al. | 106/719 |

OTHER PUBLICATIONS

Halliburton brochure entitled "The PermSeal™ System, Versatile, Cost-Effective Sealants for Conformance Applications", 4 pages, Jun. 1997.

* cited by examiner

Primary Examiner—Philip C. Tucker
(74) Attorney, Agent, or Firm—Robert A. Kent; Brian J. Hubbard

(57) ABSTRACT

A method and sealing composition is provided for sealing a subterranean zone penetrated by a well bore, wherein the sealing composition comprises a mixture of cementitious material, cross-linkable material, and sufficient water to form a slurry.

22 Claims, No Drawings

SEALING COMPOSITION

BACKGROUND

The present embodiment relates generally to a sealing composition for sealing a subterranean zone penetrated by a well bore.

In the drilling and completion of an oil or gas well, a cementing composition is often introduced in the well bore for cementing pipe string or casing. In this process, known as "primary cementing," the cementing composition is pumped into the annular space between the walls of the well bore and the casing. The cementing composition sets in the annular space, supporting and positioning the casing, and forming a substantially impermeable barrier, or cement sheath, which isolates the well bore into subterranean zones. Thus, the undesirable migration of fluids between zones is prevented after primary cementing.

Changes in pressure or temperature in the well bore over the life of the well can result in compromised zonal isolation. Also, activities undertaken in the well bore, such as pressure testing, well completion operations, hydraulic fracturing, and hydrocarbon production can affect zonal isolation. Such compromised zonal isolation is often evident as cracking or plastic deformation in the cementing composition, or de-bonding between the cementing composition and either the well bore or the casing. Compromised zonal isolation requires remedial operations to reestablish isolation between the zones.

One such remedial operation is known as a squeeze, where pressure is used to force a sealing composition into cracks or other leak paths and restore zonal isolation. Accordingly, a sealing composition comprising cement can be used in a squeeze operation to plug a perforated interval of casing and sheath, and is particularly useful for such a use because cement allows subsequent re-perforation if desired. Therefore, a sealing composition incorporating cement, but having superior sealing properties, is desirable for squeeze operations.

DESCRIPTION

A sealing composition for sealing a subterranean zone penetrated by a well bore according to the present embodiment comprises a mixture of cementitious material ("cement"), cross-linkable material, and sufficient water to form a slurry.

A variety of cements can be used with the present embodiment, including cements comprised of calcium, aluminum, silicon, oxygen, and/or sulfur, which set and harden by reaction with water ("hydraulic cements"). Such hydraulic cements include Portland cements, pozzolan cements, gypsum cements, aluminous cements, silica cements, and alkaline cements. Portland cements of the type defined and described in API Specification 10, 5$^{th}$ Edition, Jul. 1, 1990, of the American Petroleum Institute (the entire disclosure of which is hereby incorporated as if reproduced in its entirety) are preferred. API Portland cements include Classes A, B, C, G, and H, of which API Class G is particularly preferred for the present embodiment. It is understood that the desired amount of cement is dependent on the volume required for the sealing operation. Alternatively, the cement can be microfine cement, such as is available from Dyckerhoff GmBH, Lengerich, Germany, under the trademark "MICRODUR RU."

In a first embodiment, the cross-linkable material is a 2-hydroxy ethyl acrylate monomer, such as is available from Halliburton Energy Services of Duncan, Okla., under the trademark "PERMSEAL™." Such cross-linkable material is described in U.S. Pat. Nos. 5,358,051 and 5,335,726, the entire disclosures of which are incorporated herein as if reproduced in their entireties. Preferably, the cross-linkable material is present in a range of 0.3 mass percent to 10 mass percent of the sealing composition.

In a second embodiment, the cross-linkable material is a copolymer of acrylamide and t-butyl acrylate, such as is available from Halliburton Energy Services of Duncan, Okla., under the trademark "H$_2$ZERO™." Such cross-linkable material is described in U.S. Pat. Nos. 5,836,392, 6,192,986, and 6,196,317, the entire disclosures of which are incorporated herein as if reproduced in their entireties. Preferably, the cross-linkable material is present in a range of 0.3 mass percent to 10 mass percent of the sealing composition.

The water used to form the slurry is present in an amount sufficient to make the slurry pumpable for introduction down hole. The water used to form a slurry in the present embodiment can be fresh water, unsaturated salt solution, including brines and seawater, and saturated salt solution. Generally, any type of water can be used, provided that it does not contain an excess of compounds well known to those skilled in the art, that adversely affect properties of the sealing composition. The water is present in a range of about 25–98 mass percent of the sealing composition, and more preferably in an amount of about 38 mass percent of the sealing composition.

In an alternative embodiment, the sealing composition may further comprise a latex comprising a styrene/butadiene copolymer having a styrene to butadiene weight ratio of about 25:75, with the styrene/butadiene copolymer suspended in a 50% by weight aqueous emulsion, discussed in U.S. Pat. No. 5,688,844, and available from Halliburton Energy Services of Duncan, Okla., under the trademark "LATEX 2000™."

In another alternative embodiment, the sealing composition may further comprise a stabilizer, such as a $C_{15}$ alcohol ethoxylated with 40 moles of ethylene oxide, available from Halliburton Energy Services of Duncan, Okla., under the trademark "434C™."

A variety of additives may be added to the sealing composition to alter its physical properties. Such additives may include slurry density modifying materials (e.g., silica flour, silica fume, sodium silicate, microfine sand, iron oxides and manganese oxides), dispersing agents, set retarding agents, set accelerating agents, fluid loss control agents, strength retrogression control agents, and viscosifying agents well known to those skilled in the art.

The following example is illustrative of the methods and compositions discussed above.

EXAMPLE 1

Components in the amounts listed in TABLE 1 were added to form five slurries for squeeze operations. Slurries 1 and 2 contained no cross-linkable material, while Slurries 3–5 contained cross-linkable material dispersed in fresh water in a ratio of 5% by weight of the resulting composition.

Slurries 1–5 variously include one or more of the following additives: fine silica flour available from Halliburton Energy Services of Duncan, Okla., under the trademark "SSA-1™"; a bond improving/expanding additive comprising dead burned magnesium oxide for providing crystalline growth, available from Halliburton Energy Services of Duncan, Okla., under the trademark "MICROBOND HT™"; a fluid loss additive comprising a copolymer of AMPS and N,N dimethylacrylamide, available from Halliburton Energy Services of Duncan, Okla., under the trademark "HALAD®-344"; and a friction reducer comprising the condensation reaction product of formaldehyde, acetone and sodium bisulfite, available from Halliburton Energy Services of Duncan, Okla., under the trademark "CFR-3L™."

Various properties determined for each slurry are listed in TABLE 1.

TABLE 1

| Component | Slurry 1 | Slurry 2 | Slurry 3 | Slurry 4 | Slurry 5 |
|---|---|---|---|---|---|
| H₂ZERO cross-linkable material [% by weight of cement ("bwoc")] | — | — | 45.9 | 45.7 | 61.6 |
| Fresh water [% bwoc] | 45.9 | 61.6 | — | — | — |
| Portland Class 'G' cement [% bwoc] | 100 | 100 | 100 | 100 | 100 |
| SSA-1 silica flour [% bwoc] | — | 35 | — | — | 35 |
| MICROBOND HT additive [% bwoc] | — | 0.75 | — | — | 0.75 |
| HALAD ® -344 fluid loss additive [% bwoc] | 0.4 | 0.3 | — | 0.3 | 0.3 |
| CFR-3L friction reducer [l/100 kg] | — | 0.25 | — | 0.25 | 0.25 |
| Density [SG] | 1.85 | 1.85 | 1.85 | 1.85 | 1.85 |
| BHST [° F.] | 212 | 257 | 212 | 212 | 257 |
| Rheology at mix 300-200-100-6-3 | ND | ND | 262-187-105 21-17 | 300+-300+- 289-22-14 | 300+-300+- 224-25-18 |
| Rheology @ 195° F. 300-200-100-6-3 | ND | ND | 197-140-87 20-17 | 300+-300+- 185-12-7 | ND |
| Squeeze pressure [psi] | 300 | 250 | 250 | 250 | 250 |
| Captured filtrate [cc/min] | — | — | 100/3 | 15/30 | 5/5 |
| Gelled | — | — | Yes | Yes | Yes |
| Max. flowback pres. [psi] | 300 | 600 | 750 | 2100 | 2250 |

As shown in Table 1, Slurry 1 was a standard cement slurry which had a flowback pressure of 300 psi. Slurry 2 was a standard cement slurry tested at a higher bottom hole static temperature (BHST), and had a backflow pressure of 600 psi.

In contrast, Slurry 3, a composition according to the present invention, had a backflow pressure of 750 psi, more than twice that of the standard (Slurry 1). Slurry 4, also a composition according to the present invention, was treated with fluid loss additive and had a much higher backflow pressure of 2100 psi. Slurry 5, also a composition according to the present invention, was tested at a higher bottom hole static temperature, and had a backflow pressure of 2250 psi, more than three times that of the applicable standard (Slurry 2). Thus, TABLE 1 shows the increased effectiveness of the sealing compositions of the present invention.

EXAMPLE 2

Components in the amounts listed in TABLE 2 were added to form two slurries, Slurries 6–7, which contained cross-linkable material gelled in fresh water in a ratio of 5% by weight of the resulting composition.

TABLE 2

| Component | Slurry 6 | Slurry 7 |
|---|---|---|
| H₂ZERO cross-linkable material [% bwoc] | 49.42 | — |
| PERMSEAL cross-linkable material [% bwoc] | — | 49.63 |
| Fresh water [% bwoc] | — | — |
| Dyckerhoff 'G' cement [% bwoc] | 100 | 100 |
| Density [SG] | 1.85 | 1.85 |
| BHST [° F.] | 195 | 195 |
| Rheology at mix | | |
| 300-200-100-6-3 | 300+-220-136- 39-35 | 57-48-35- 16-15 |
| Rheology @ 195° F. | | |
| 300-200-100-6-3 | 218-173-77- 6-3 | ND |
| Squeeze pressure [psi] | 250 | 250 |
| Captured filtrate [cc/min] | 60/5 | 62/0.5 |
| Gelled | Yes | Yes |
| UCA | | |
| 50 psi [hrs:min] | ND | 64:49 |
| 500 psi [hrs:min] | 23:27 | ND |
| Final CS [psi/hrs] | ND | ND |

Table 2 shows that the filtrate of both Slurries 6 and 7 gelled, while providing a curable sealing composition.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

What is claimed is:

1. A method of sealing a subterranean zone comprising:
   preparing a sealing composition comprising cement, a cross-linkable material comprising 2-hydroxy ethyl acrylate monomer, and water;
   placing the sealing composition into the subterranean zone; and
   allowing the sealing composition to set therein.

2. The method of claim 1 wherein the cement is Portland cement, pozzolan cement, gypsum cement, aluminous cement, silica cement, or alkaline cement.

3. The method of claim 1 wherein the cement is class G cement.

4. The method of claim 1 wherein the 2-hydroxy ethyl acrylate monomer is present in a range of 0.3 mass percent to 10 mass percent.

5. The method of claim 1 wherein the water is present in a range of 25–98 mass percent.

6. A sealing composition for sealing a subterranean zone comprising:
   cement, a cross-linkable material comprising 2-hydroxy ethyl acrylate monomer, and water.

7. The composition of claim 6 wherein the cement is Portland cement, pozzolan cement, gypsum cement, aluminous cement, silica cement, or alkaline cement.

8. The composition of claim 6 wherein the cement is class G cement.

9. The composition of claim 6 wherein the 2-hydroxy ethyl acrylate monomer is present in a range of 0.3 mass percent to 10 mass percent.

10. The composition of claim 6 wherein the water is present in a range of 25–98 mass percent.

11. The composition of claim 6 further comprising a latex with a styrene/butadiene weight ratio of about 25:75, with the styrene/butadiene copolymer suspended in a 50% by weight aqueous emulsion.

12. The composition of claim 6 further comprising a stabilizer.

13. A method of sealing a subterranean zone comprising:
   preparing a sealing composition comprising cement, a copolymer comprising acrylamide and t-butyl acrylate, and water;
   placing the sealing composition into the subterranean zone; and
   allowing the sealing composition to set therein.

14. The method of claim 13 wherein the cement is Portland cement, pozzolan cement, gypsum cement, aluminous cement, silica cement, or alkaline cement.

15. The method of claim 13 wherein the cement is class G cement.

16. The method of claim 13 wherein the copolymer comprising acrylamide and t-butyl acrylate is present in a range of 0.3 mass percent to 10 mass percent.

17. A sealing composition for sealing a subterranean zone comprising:
   cement, a copolymer comprising acrylamide and t-butyl acrylate, and water.

18. The composition of claim 17 wherein the cement is Portland cement, pozzolan cement, gypsum cement, aluminous cement, silica cement, or alkaline cement.

19. The composition of claim 17 wherein the cement is class G cement.

20. The composition of claim 17 wherein the copolymer comprising acrylamide and t-butyl acrylate is present in a range of 0.3 mass percent to 10 mass percent.

21. The composition of claim 17 further comprising a latex with a styrene/butadiene weight ratio of about 25:75, with the styrene/butadiene copolymer suspended in a 50% by weight aqueous emulsion.

22. The composition of claim 17 further comprising a stabilizer.

* * * * *